Sept. 1, 1964 R. E. BELL ETAL 3,147,470
NUMERICAL DISPLAY DEVICE WITH SOLENOID
CONTROLLED TOOTH INTERCEPTION
Filed March 29, 1960 6 Sheets-Sheet 6
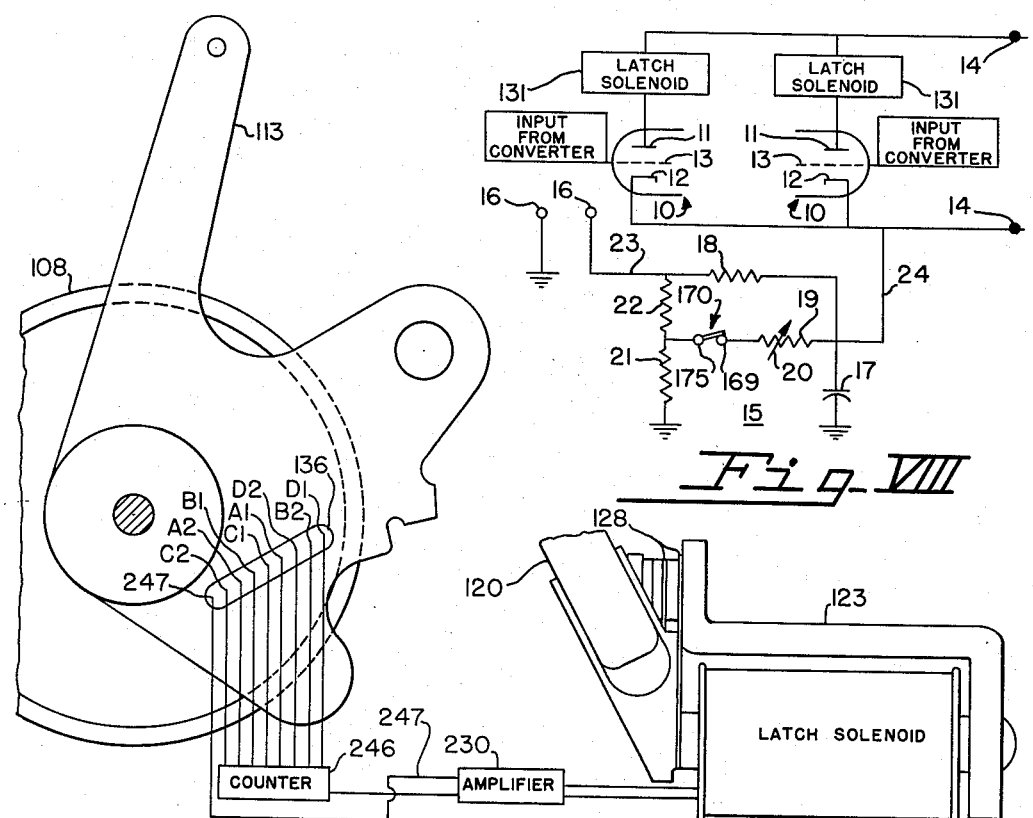
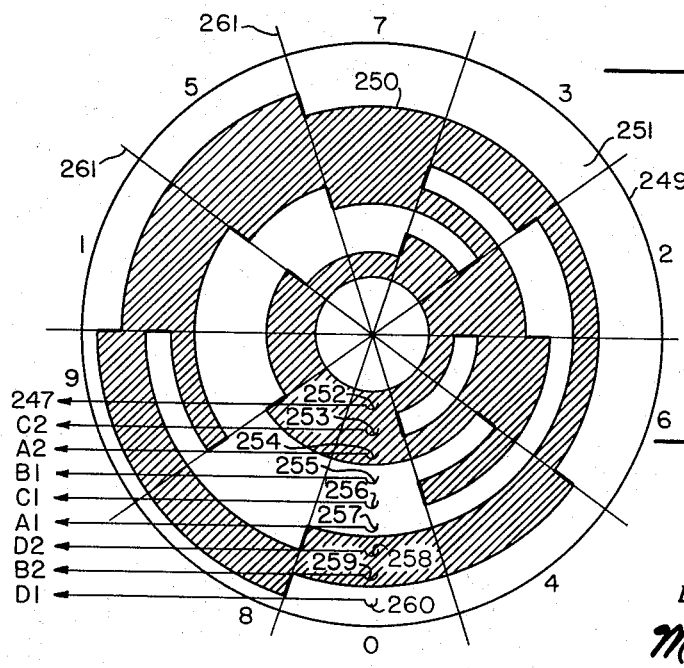
INVENTORS
ROBERT E. BELL
RICHARD C. LOSHBOUGH
BY
Marshall & Wilson
ATTORNEYS

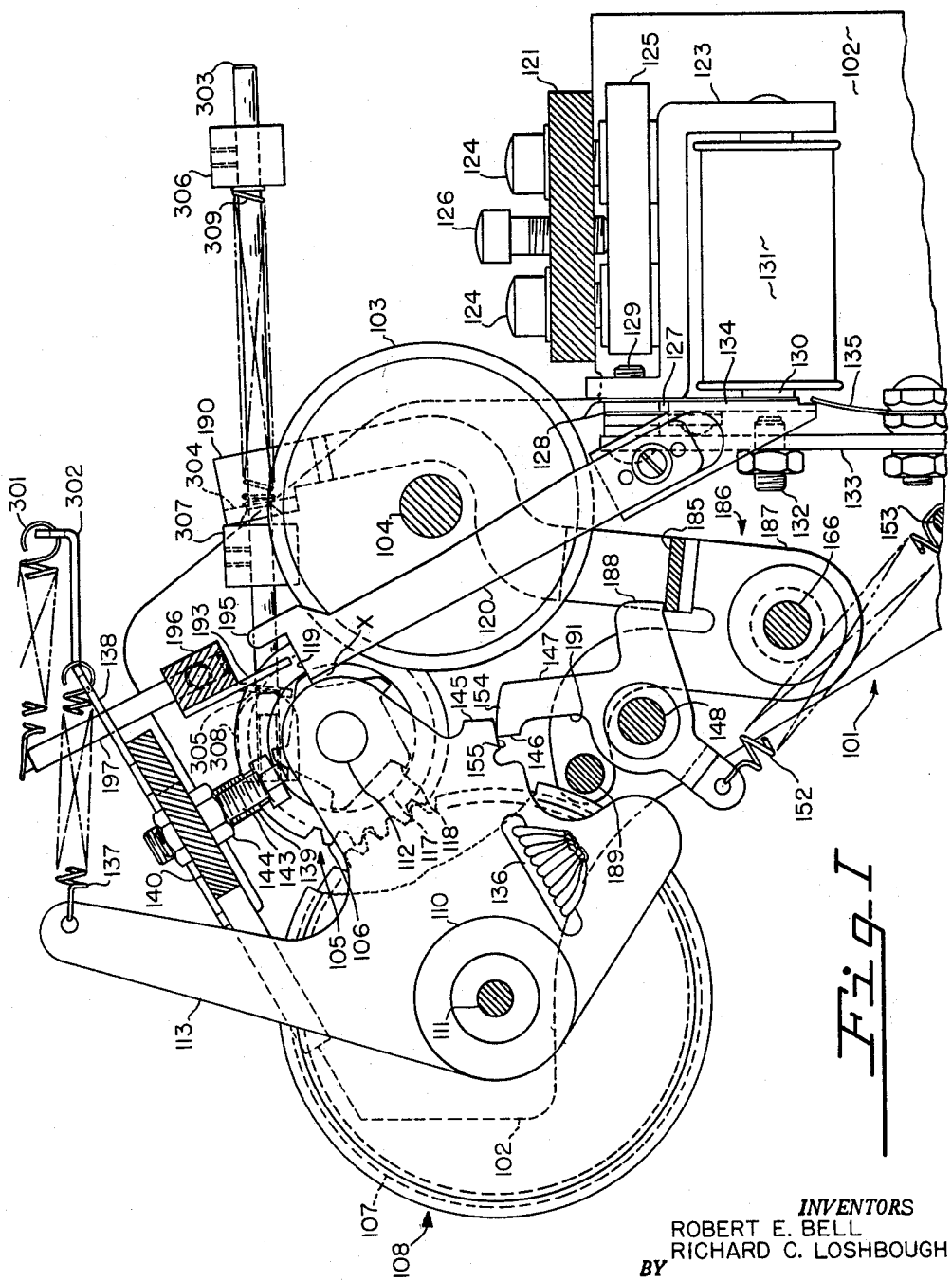

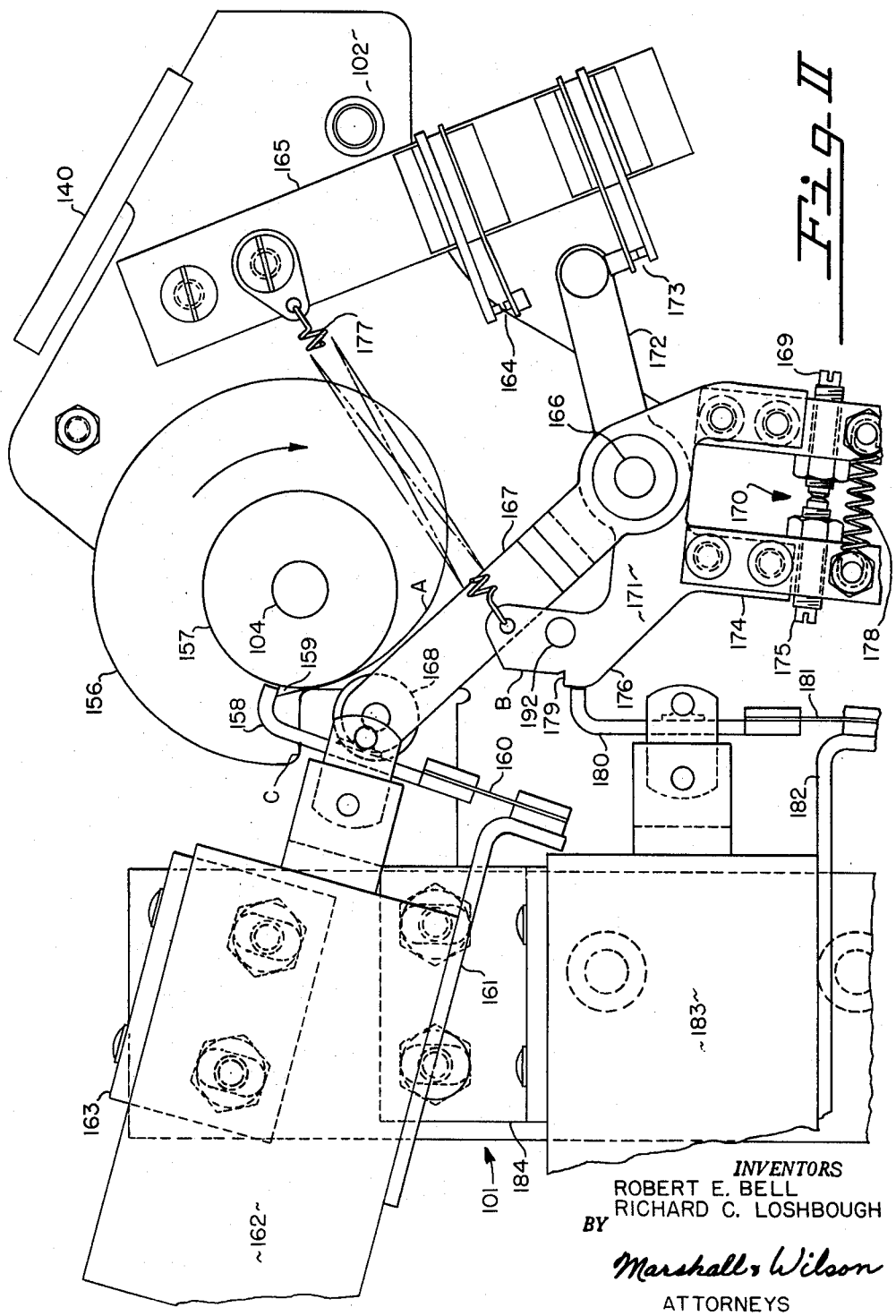

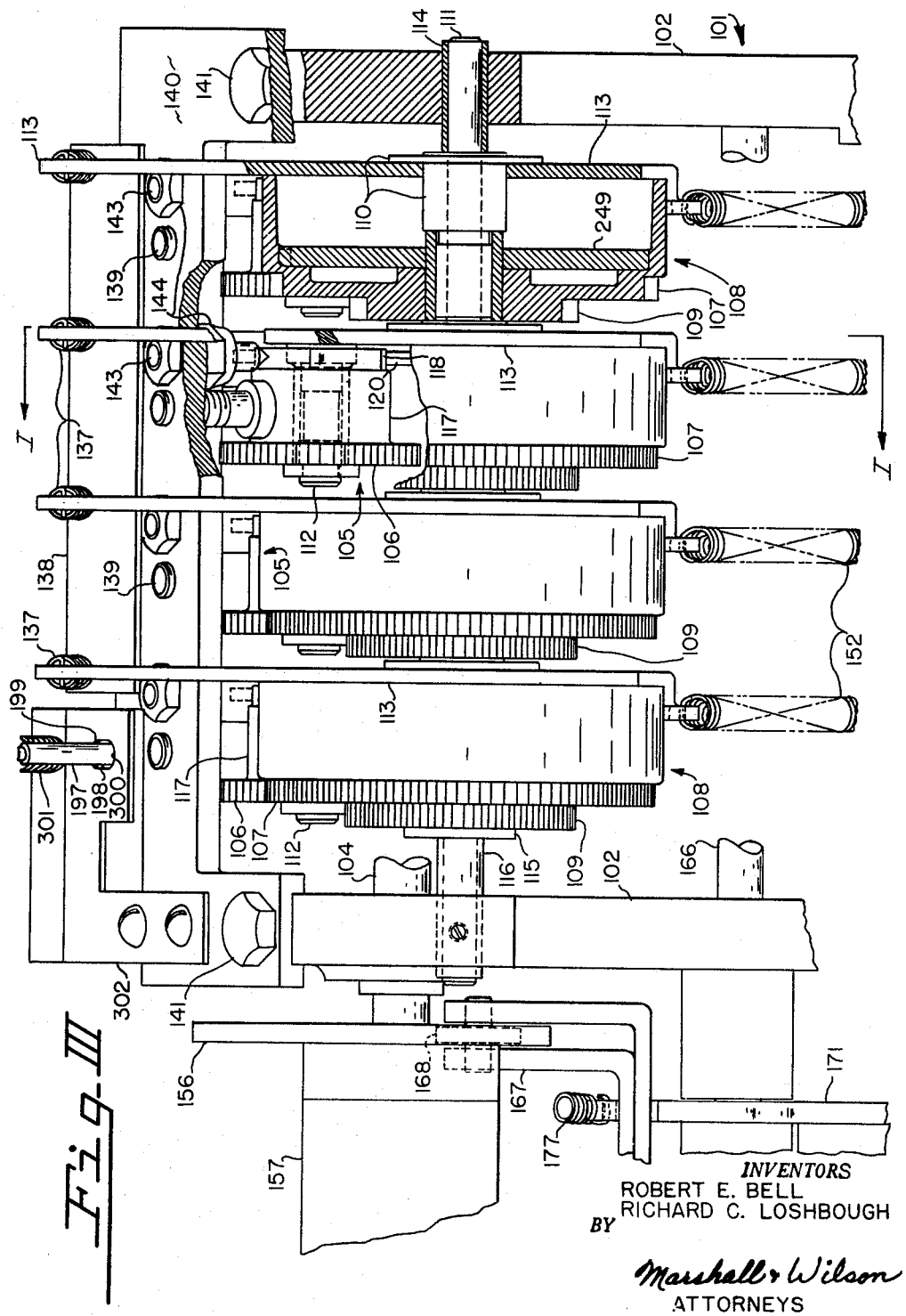

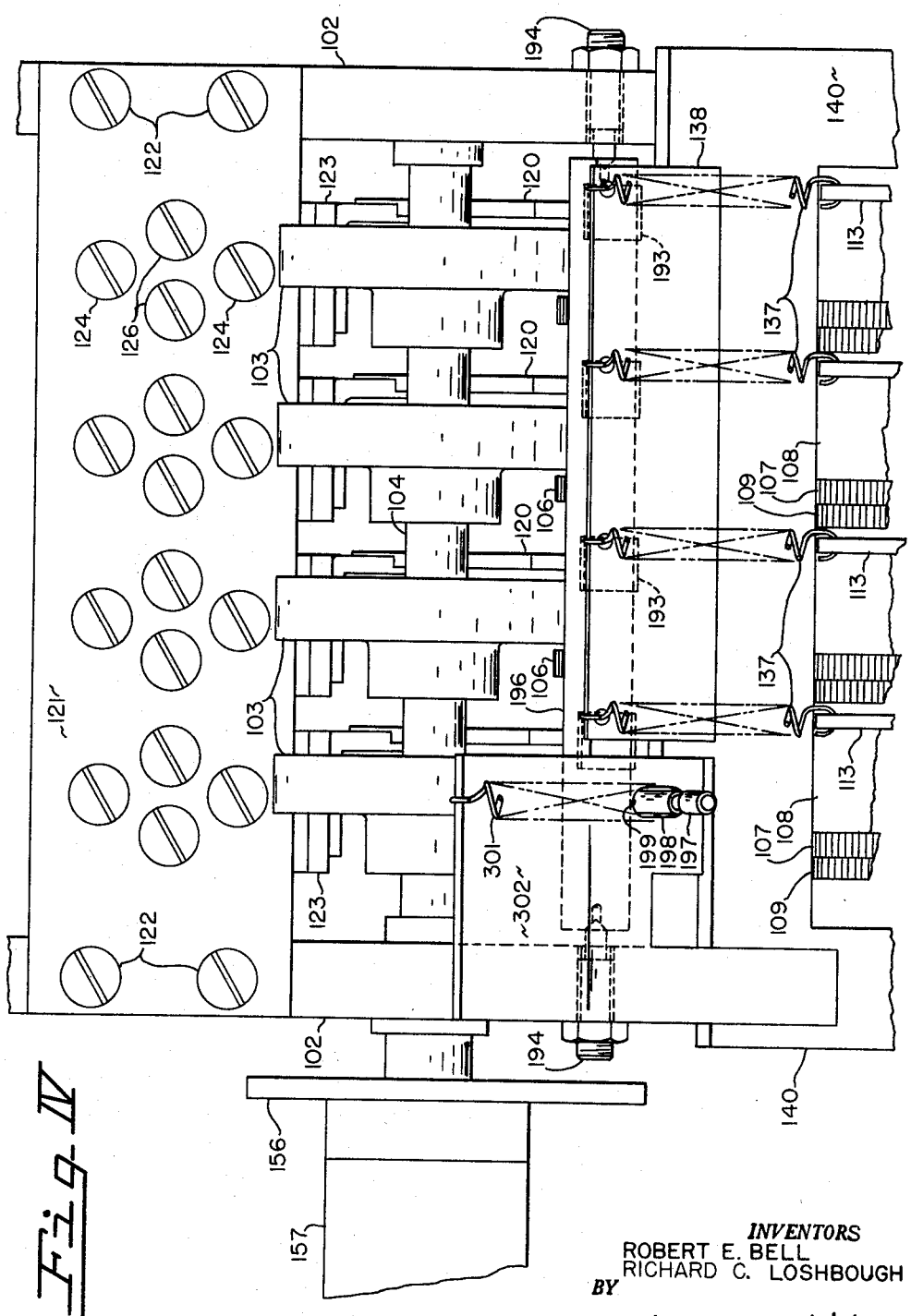

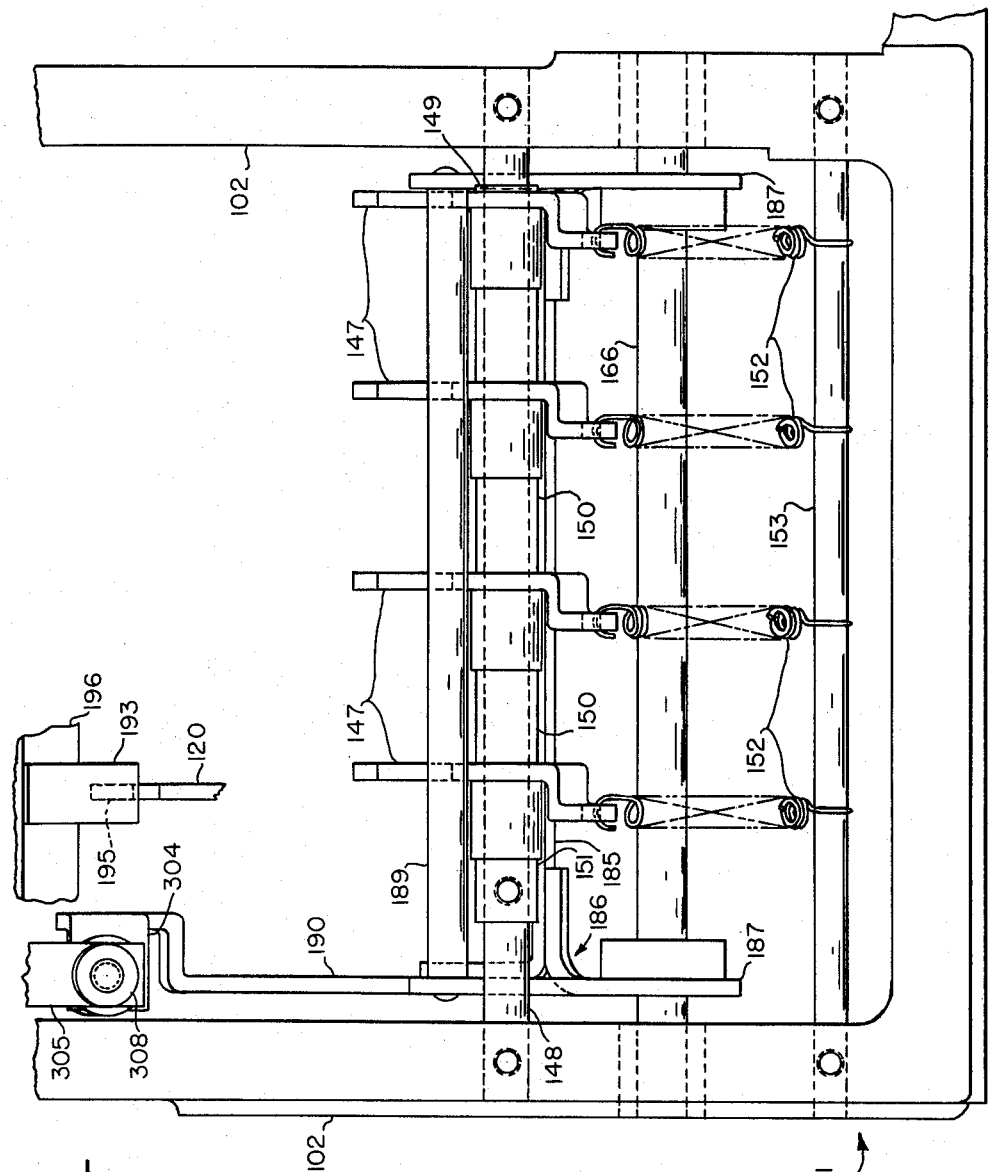

United States Patent Office 3,147,470
Patented Sept. 1, 1964

3,147,470
NUMERICAL DISPLAY DEVICE WITH SOLENOID CONTROLLED TOOTH INTERCEPTION
Robert E. Bell and Richard C. Loshbough, Toledo, Ohio, assignors to Toledo Scale Corporation, Toledo, Ohio, a corporation of Ohio
Filed Mar. 29, 1960, Ser. No. 18,323
19 Claims. (Cl. 340—347)

This invention relates to numerical display devices that are adapted to be actuated from the output of an electronic counter or a similar device.

Numerical display devices of the type to which the invention relates are mechanically-driven and electrically-controlled and are often known as "readout" devices. Such numerical display devices are connected to electronic counters when it is desired to display indications corresponding to the counts accumulated in the counters in conventional and aligned figures so that they can be easily read. When the numerical display devices are so connected to the counters, they indicate the counts that exist in the counters when the counters reach the quiescent state.

Such numerical display devices include number display wheels, drive means for the wheels, and stopping latches for the drive means which stop the drive means and thus the number display wheels in readout positions. An example of such a numerical display device is disclosed in U.S. Patent No. 2,759,672 issued August 21, 1956 to C. S. Simonds and C. E. Adler. The numerical display device disclosed in such patent includes a number display wheel, a continuously running power wheel, toothed drive means gear connected to the number wheel and frictionally engageable with the power wheel, and a stopping latch engageable with the toothed drive means. Ideally, when the turning number wheel approaches the correct indicating position, the stopping latch squarely intercepts the correct one of five teeth on the drive means to instantly arrest the drive means and number wheel in such correct indicating position. Should the stopping latch be operated too soon or too late, the end of the latch may catch on the tip of one of the teeth causing damage to the tooth and/or causing the number wheel to stop in an incorrect indicating position.

Ideal tooth interception is complicated by several factors. The complete numerical display device consists of a plurality of duplicate sub-assemblies, one for each place in the number to be indicated. These subassemblies are operated at high speeds, must be started simultaneously when a new reading is to be made, and each must be stopped on an individual basis. The stopping latches, there being one for each number wheel, are solenoid-operated by solenoids which, when they are conditioned for operation, respond to signals transmitted through circuits controlling the indications of the counts. The solenoids are conditioned for operation through the turning on of a power supply that must be turned off every time a new reading is made to permit removal of the stopping latches from their teeth-obstructing positions.

The ideal tooth interception in prior numerical display devices happened more or less only as a matter of chance, the stopping latches in such devices often catching on the tips of the teeth and causing damage. The only remedy in such cases has been to frequently replace the toothed-members with new ones. It has been discovered that the secret to successful operation is to turn on the power supply to condition the stopping latch solenoids for stopping at just the right time so that the stopping latches always are operated to intercept the proper ones of the teeth squarely. That is, the stopping latch solenoids respond to signals transmitted through circuits controlling the indications of the counts only when they are conditioned by the turning on of their power supply, means in the nature of a supervisory control being provided according to the invention to turn on such power supply at just the right time. Hence, ideal tooth interception depends on the phasing of rapidly happening events. The appreciation, let alone the solution, of just what the problem was in the operation of the prior numerical display devices in itself consumed a considerable amount of time and effort.

It is, accordingly, the principal object of this invention to provide means in the nature of a supervisory control for phasing the events in a mechanical drive numerical display device to provide optimum operation.

Another object of the invention is to provide a mechanical drive for simultaneously starting the numerical display wheels of an electrically-controlled indicating device and for stopping such wheels with a minimum of wear on the operating parts.

Still another object is to provide adjustable circuit means for conditioning the stopping latch means in a numerical display device for operation in response to signals transmitted through circuits controlling the indications of counts only when toothed-members to be stopped by such stopping latch means are so positioned that it is possible for the stopping latch means to intercept such toothed-members squarely.

A further object is to provide phasing circuitry and apparatus for a numerical display device which insures that the device's numerical display wheels always are stopped in correct indicating positions.

More specific objects and advantages are apparent from the following description of a specific embodiment of the invention.

According to the invention, means are provided in a numerical display device of the type disclosed in the foregoing U.S. Patent No. 2,759,672 for phasing certain of the events to provide optimum operation. Such a numerical display device includes a plurality of duplicate subassemblies one for each place in the number to be indicated. Each of the subassemblies comprises a numerical display wheel. When the wheel approaches the position at which it is to stop, a signal is transmitted through a binary to decimal converter circuit controlling the indication of the count to cause an end of a solenoid-operated latch to intercept the approaching tooth on a toothed-member which drives the numeral display wheel thereby stopping the wheel at one of ten possible stopping positions.

The means of the invention for phasing the events to provide optimum operation includes a time delay circuit which applies power to the solenoid of the solenoid-operated latch when a new reading is to be made and which removes power from such solenoid to permit removal of the latch from its tooth-obstructing position. The solenoid responds to the signal from the binary to decimal converter circuit only when it is conditioned by the turning on of its power supply. By adjusting the delay provided by the time delay circuit it is possible to condition the solenoid for operation only when the toothed-member to be stopped by the solenoid-operated latch is so positioned relative to the latch that the latch has time to intercept a selected one of the teeth on the toothed-member squarely.

One of the features of the invention is the provision of the foregoing time delay which is adjustable to turn the power back on to the solenoid when the teeth on the toothed-member have such an orientation relative to the stopping latch that the latch has time to catch the correct tooth squarely. When the toothed-member is so oriented, brushes of the binary to decimal converter circuit are in a particular orientation relative to a commutator of such circuit as hereinafter described. Hence, power is turned back on to the solenoid according to the invention in accordance with an optimum position of such brushes relative to the commutator, which position is such as hereinafter described that the latch has time to catch the correct tooth squarely.

Another feature of the invention is the provision of mechanism having a consistent operating time for operating contacts in the foregoing time delay circuit to first remove power from the solenoid of the solenoid operated latch when a new reading is to be made to permit removal of the latch from its tooth-obstructing position and then reapply power to the solenoid to so condition it that it will respond to the signal from the binary to decimal converter circuit. In many prior numerical display devices, power is removed and reapplied by means having indeterminate operating times. Therefore, the ideal interception of a tooth on the toothed driving member in such a prior device happened only as a matter of chance. In contrast, according to the invention, power is removed from all of the solenoids of the stopping latches and reapplied by mechanism having a determinate operating time, the adjustable time delay being provided to make such time between power removal and reapplication such that optimum performance is obtained from the numerical display device. Once the length of the time delay is properly adjusted, the selected time between the removal and the reapplication of the power being consistent from cycle to cycle, the power always is turned back on when the teeth on the toothed-member have such an orientation relative to the stopping latch that such latch always has time to catch the correct tooth squarely.

A preferred embodiment of the invention is illustrated in the accompanying drawings.

In the drawings:

FIG. I is a vertical sectional view taken along the line I—I of FIG. III;

FIG. II is a fragmentary end elevational view as seen from a position to the left of the device shown in FIG. III;

FIG. III is a fragmentary front elevational view of the numerical display device, parts being shown in section;

FIG. IV is a fragmentary plan view of the device shown in FIG. III;

FIG. V is a fragmentary front elevational view as seen from a position to the left of the device as shown in FIG. I;

FIG. VI is a fragmenetary side elevational view generally similar to FIG. I showing a circuit controlling the indication of a count to the numerical display device from a counter;

FIG. VII is a diagram of brushes and a commutator used in the circuit controlling the indication of a count; and FIG. VIII is a time delay circuit conditioning the numerical display device for stopping in correct indicating position with minimum wear on the operating parts.

These specific figures and the accompanying description are intended merely to illustrate the invention but not to impose limitations on its scope.

The numerical display or readout device is constructed on a frame 101 having upstanding end members 102, the frame 101 having a flat bottomed U-shape as viewed from the front (FIG. V). The complete device comprises a plurality of duplicate subassemblies, one for each place in the number to be indicated. The several subassemblies, one of which is shown in FIG. I, are driven by a series of rubber-tired power wheels 103 mounted on a power shaft 104 journaled in bearings in the upstanding end frame members 102. The power wheels 103 are continuously rotated when the readout device is in operation and, when engaged, frictionally drive a plurality of intermediate drive wheels or idlers 105. Each of the idlers 105 has a gear 106 meshed with a gear 107 on a generally cup-shaped hollow drum member 108 bearing indicia (not shown) on its cylindrical surface, there being a drum member for each idler, the total number depending on the places in the number to be indicated. The indicia are like those shown in FIG. I in the foregoing U.S. Patent No. 2,759,672 and are visible through windows like those shown in such patent. A second gear 109 (FIG. III) on each of the drum members 108 is used to set up type wheels in a printer (not shown) corresponding to the indicia displayed through the windows.

Each of the drum members 108 is mounted for rotation on a hub 110 which in turn is mounted for rotation on a stationary shaft 111 supported by the end frame members 102. Each of the idlers 105 is rotatably mounted on a pin 112 fixed to a support member 113, which, because each of the support members 113 is mounted on one of the hubs 110, is rockably mounted on the stationary shaft 111. Thus, there is a rockable support member 113 carrying an idler 105 together with an associated drum member 108 for each place in the number to be indicated. The rockable support members 113 and the drum members 108 have a common pivotal axis defined by the axis of the stationary shaft 111. A clamp 114, in the form of a split tube, on the right hand end of the stationary shaft 111 as viewed in FIG. III, locates the right hand one of the rockable support members 113, the hub 110 of such support member contacting such clamp 114. The next one of the hubs 110 is located on the stationary shaft 111 in contact with the gear 109 to its immediate right, the subassemblies being stacked on the shaft 111 one against the other as shown in FIG. III. A spacing washer 115 on the stationary shaft 111 contacts the left hand one of the gears 109 and an end of a second clamp 116 which also is in the form of a split tube contacts such washer 115. The axial position of the subassemblies on the stationary shaft 111 is adjusted by shifting the clamps 114 and 116 axially on the stationary shaft 111.

The idlers 105 each includes, to cooperate with the power wheels 103, a friction drive surface 117, which may be knurled, flanked by the gear 106 on one side and by five equally spaced teeth 118 on the other side. When the readout device is in operation so that the power wheels 103 are constantly rotated and when the support members 113 are rocked to engage the drive surfaces 117 of the idlers 105 with the power wheels 103, the power wheels continuously rotate the idlers. The rotating idlers 105 drive the drum members 108 at half their speed, the idlers being engaged at all times with the drum members through the meshed gears 106 and 107.

When a turning drum 108 approaches the position at which it is to stop, a signal is transmitted through a binary to decimal converter circuit, shown in FIGS. VI and VII, controlling the indication of the count to cause an end 119 of a solenoid-operated latch 120, one of which is provided for each idler 105, to intercept the approaching one of the five teeth 118 on the side of the idler 105 at a position adjacent the associated power wheel 103 thereby stopping that one of the drum members 108 at one of ten possible stopping positions. A plate 121, held by means of screws 122 on the frame 101, supports each of four Z-shaped brackets 123, one for each of the latches 120, by means of a pair of screws 124 threaded through a small plate 525 and into the Z-shaped bracket 123. The screws 124 hold the small plate 125 up against the lower ends of a pair of screws 126, the screws 124 and 126 providing adjustments for suitably positioning the Z-shaped bracket 123. The latch 120 is fulcrumed at 127 by means of a pair of top flexure springs 128 held by means of a screw 129 on the bracket 123 and is rockable between limits determined by a core 130 of a latch solenoid 131, carried by the bracket 123, and a stop screw 132 carried by a plate 133 also attached by means of the screw 129 to the bracket 123, an end member 134 of the latch 120 being rockable between such limits. The plate 133 also carries a bottom flexure spring 135 which has its upper and free end engaging the lower end of the latch end member 134. When the solenoid 131 is energized, the core 130 attracts the latch end member 134, the upper flexure springs 128 being unflexed and the lower flexure spring 135 being bent back in the position shown in FIG. I. When the solenoid 131 is deenergized, the lower flexure spring 135 straightens out in opposition to the top flexure springs 128 to remove the latch end 119 from engagement with the intercepted tooth 118.

The solenoids 131 each is energized by the signal through the binary to decimal converter circuit controlling the indication of a count. Ten possible stopping positions are provided for each of the drums 108 because the readout device indicates in the decimal system of notation. Should some other system of notation be employed, a different number of teeth 118 or a different ratio between the idlers and the drums or both would be used. The present device provides the ten stopping positions for each of the drum members 108 with five teeth 118 on each of the idlers 105 and a two to one gear ratio between the drum members 108 and the idlers 105.

The signal controlling the indication of a count is carried through the binary to decimal conversion circuit shown in FIGS. VI and VII, in which a set of nine brushes mounted on the support member 113 cooperate with a single conducting member 250 on a commutator 249 arranged in a certain pattern and carried on the drum member 108, there being a separate circuit for each drum member 108 and its associated drive. Information relative to a count accumulated in a binary system electronic counter 246 is transmitted through a series of leads A1, A2; B1, B2; C1, C2; and D1, D2 that connect four stages, hereinafter referred to as stages A, B, C, and D, of the electronic counter to the conducting member. An electronic counter of the binary type suitable for energizing the commutator 249 is disclosed in copending application Serial No. 818,858 filed June 8, 1959, in the names of Robert E. Bell and Richard C. Loshbough. A set of nine brushes 252 to 260, one for each of the leads A1, A2, B1, B2, etc., and one for an output lead 247 going to a latch activating circuit amplifier 230, are provided. The commutator member 249 is provided with a conducting surface 250 and insulated surfaces 251. The commutator 249 may be mounted in any desired manner as long as it rotates in synchronism with the rotary drum 108. The series of brushes 252 to 260 are mounted in a slot 136 of the rockable support member 113 and are arranged to cooperate with the commutator 249. The output brush 252, always contacting the conducting surface 250, is connected to the output lead 247. The brushes 253 to 260 are connected to each stage of the counter 246. In the particular arrangement the connections are: brush 253—lead C2 of stage C; Brush 254—lead A2 of stage A; brush 255—lead B1 of stage B; brush 256—lead C1 of stage C; brush 257—lead A1 of stage A; brush 258—lead D2 of stage D; brush 259—lead B2 of stage B; and brush 260—lead D1 of stage D.

The following tables show the counter condition and the voltage fed to the amplifier for each digit to be indicated (state of the counter) and each relative position of the commutator and brushes. In each of the tables the first column indicates the number registered in the electronic counter; in Table I the second to fifth columns inclusive indicate which of the leads A–1 or A–2, B–1 or B–2, C–1 or C–2, D–1 or D–2 is energized, i.e., is positive with respect to the other. The commutator in each position connects four of the eight leads, one from each pair, to the amplifier. The resulting voltage, depending upon the number of connected and energized leads, varies from four units (when all the connected leads are energized) to zero units (when none are energized). The intermediate voltage levels are one unit, two units, and three units depending upon whether one, two, or three of the connected leads are positive. The control may be arranged to operate when all the connected leads are positive or all negative.

These voltage levels are indicated in columns 2 to 11 inclusive of Table II for each position of the commutator for each number that may be registered in the counter. It should be noted that the voltage level rises and falls by unit steps and reaches four units (to stop the indicator) only once in each revolution.

*Table I*

| Number in Counter | Leads Energized | | | |
|---|---|---|---|---|
| | A | B | C | D |
| 0 | 2 | 2 | 2 | 2 |
| 1 | 1 | 2 | 2 | 2 |
| 2 | 2 | 1 | 2 | 2 |
| 3 | 1 | 1 | 2 | 2 |
| 4 | 2 | 2 | 1 | 2 |
| 5 | 1 | 2 | 1 | 2 |
| 6 | 2 | 1 | 1 | 2 |
| 7 | 1 | 1 | 1 | 2 |
| 8 | 2 | 2 | 2 | 1 |
| 9 | 1 | 2 | 2 | 1 |

*Table II*

| Number in Counter | Voltage to Amplifier in Units at Each Commutator Position | | | | | | | | | |
|---|---|---|---|---|---|---|---|---|---|---|
| | 0 | 8 | 9 | 1 | 5 | 7 | 3 | 2 | 6 | 4 |
| 0 | 4 | 3 | 2 | 3 | 2 | 1 | 2 | 3 | 2 | 3 |
| 1 | 3 | 2 | 3 | 4 | 3 | 2 | 3 | 2 | 1 | 2 |
| 2 | 3 | 2 | 1 | 2 | 1 | 2 | 3 | 4 | 3 | 2 |
| 3 | 2 | 1 | 2 | 3 | 2 | 3 | 4 | 3 | 2 | 1 |
| 4 | 3 | 2 | 1 | 2 | 3 | 2 | 1 | 2 | 3 | 4 |
| 5 | 2 | 1 | 2 | 3 | 4 | 3 | 2 | 1 | 2 | 3 |
| 6 | 2 | 1 | 0 | 1 | 2 | 3 | 2 | 3 | 4 | 3 |
| 7 | 1 | 0 | 1 | 2 | 3 | 4 | 3 | 2 | 3 | 2 |
| 8 | 3 | 4 | 3 | 2 | 1 | 0 | 1 | 2 | 1 | 2 |
| 9 | 2 | 3 | 4 | 3 | 2 | 1 | 2 | 1 | 0 | 1 |

The commutator 249 is shown relative to the brushes in the position it occupies to indicate a zero. In such a position the brushes 255, 256, 257 and 260 bear on insulated portions while the remaining brushes 253, 254, 258 and 259 bear on conducting portions which are electrically connected to the portion cooperating with the brush 252 which is the output brush connected to the lead 247.

As the commutator moves one step counterclockwise from the position shown, the brush 258 passes from the conducting portion to the insulated portion while the brush 260 passes from the insulated to the conducting portions. These two brushes are connected to the fourth or D stage of the electronic counter and represent a change of eight in the count.

Proceeding clockwise in the figure (counter-clockwise movement of the commutator relative to the brushes) to the following positions that are reached as the commutator continues to rotate counterclockwise one finds that in passing to the second position from the zero, the nine position, that brush 257 passes from an insulated to a conducting segment while brush 254 passes from a conducting to an insulated portion. The same continues for the succeeding steps. In transferring from each step to the next, one brush of each pair passes from an insulated to a conducting portion while the other brush of the pair passes from a conducting to an insulated segment. In this arrangement for any possible position of the commutator with respect to the brushes four of the brushes bear on insulated portions of the commutator while the remaining four brushes bear on conducting portions. By the pattern of the insulated portions in respect to the conducting portions these combinations are varied to correspond to the combination of conducting states in the electronic counter representing each of the digits 0 to 9 inclusive. As the commutator 249 approaches a position corresponding to the count in the counter 246 the voltage on the output lead 247 rises stepwise from one voltage level to the next as it approaches the final position. This arrangement avoids the production of large transient voltages which may interfere with the operation of the counter.

The stored kinetic energy of the driven members, i.e., the idlers 105, the drum members 108, and any type wheels and their gears which may be driven by the gears 109 on the sides of the drum members 108, is used as a source of power to move certain parts of the mechanism to disengage the idlers 105 from the power wheels 103. The inertia of the driven members as they are being stopped by the engagement of the ends 119 of the latches 120 with the teeth 118 on the idlers 105 rocks the associated support members 113 about the axis of the stationary shaft 111 in a counterclockwise direction, as viewed in FIG. I, into the position shown in FIG. I. Such rocking of the support members 113 in a counterclockwise direction, which is in opposition to return springs 137, one for each of the support members, connected between the upper ends of the support members 113 and a stationary plate 138, is limited by flat headed stop screws 139 one of which contacts each of the drive surfaces 117 of the idlers 105. A bracket 140, attached to the frame 101 by means of a pair of screws 141 one threaded in each of the upstanding frame members 102, carries the plate 138 fixed thereto and also the flat headed stop screws 139. Adjacent each of the stop screws 139 is a cone pointed screw 143 the cone pointed ends of which are arranged to cooperate with the backs of the uppermost ones of the stopped idler teeth 118 as viewed in FIG. I, i.e., the counterclockwise rotation of the support members 113 moves such ones of the teeth 118 against the cone pointed screws. Lock nuts 144 hold the cone pointed screws in adjusted positions. As in any system having elasticity there is a tendency to rebound when the parts are stopped suddenly. This rebound or backward rotation of the stopped idlers 105 is prevented by the engagement of the stopped idler teeth with the cone pointed stop screws 139. Hence, the support members 113 are rockable about the axis of the stationary shaft 111 between limits determined by the stop screws 139 and 143 which contact the idlers 105 upon counterclockwise rotation of the support members 113 and by the power wheels 103 which drivingly engage the idlers 105 upon clockwise rotation of the support members 113.

Counterclockwise movements of the rockable support members 113 into the position shown in FIG. I moves a stop surface 145 on each of the rockable support members 113 out of engagement with a stop surface 146 on each of a plurality of latches 147 mounted for rotation on a stationary shaft 148 extending between the upstanding end frame members 102. There is a latch 147 for each of the rockable support members 113, the right hand one of the latches 147 as viewed in FIG. V being located against a C-ring 149 on the shaft 148 with spacers 150 separating the latches one from the other and a collar 151 on the shaft 148 holding the stack of latches and spacers together. The rockable support members 113 are aligned with the latches 147 by shifting the clamps 114 and 116 (FIG. III) on the stationary shaft 111 as hereinbefore described. Movement of the stop surfaces 145 on the rockable support members 113 out of engagement with the stop surfaces 146 on the latches 147 permits springs 152, connected to the latches and to a stationary rod 153 extending between the upstanding end frame members 102, to pivot the latches 147 counterclockwise about the axis of the stationary shaft 148 into the posiion shown in FIG. I. In such position, latch surfaces 154 on the latches 147 contact faces 155 on the rockable support members 113 as shown in FIG. I locking the rockable support members in place while the indicia bearing drums 108 are locked in indicia displaying position.

A cam 156 connected to the power shaft 104 through a one revolution clutch 157 is turned by such shaft 104 whenever a latch finger 158 is removed from its position shown in FIG. II wherein it is in the path of a stop 159 on the clutch. The latch finger 158 is pivotally mounted on a flexure spring 160 which urges the free end of the finger toward the clutch 157, the flexure spring 160 being secured to a bracket 161 carried by a solenoid 162 carried in turn by a bracket 163 fixed to the left hand one of the upstanding end frame members 102 as viewed in FIG. III. Energization of the solenoid 162 withdraws the latch finger 158 from the stop 159 and the cam 156 is turned clockwise as viewed in FIG. II about the axis of the power shaft 104. Normally open contacts 164, carried on a plate 165 fixed to the left hand one of the upstanding end frame members 102 as viewed in FIG. III, when closed by means hereinafter described cause deenergization of the solenoid 162. This occurs before the cam 156 completes its single revolution. Deenergization of the solenoid 162 allows the flexure spring 160 to move the latch finger 158 into the path of the stop 159 as illustrated in FIG. II stopping the cam 156 after it makes its one revolution. The solenoid 162 is energized when a new reading is to be made by a signal indicating that the counter 246 has reached the quiescent state. Hence, to make a new reading, the solenoid 162 is energized, whereupon the cam 156 is turned one revolution to reset the readout device, the solenoid 162 being deenergized through the closing of contacts 164 before the cam 156 completes its single revolution.

A shaft 166, journaled in the upstanding end frame members 102, has loosely mounted thereon a generally Z-shaped (as viewed in FIG. III) cam follower 167. The upper portion of the cam follower 167 as viewed in FIGS. II and III, is bifurcated and carries between the bifurcation a cam following roller 168 and the lower portion of the cam follower 167 carries a contact 169 of normally closed contacts 170. Adjacent the cam follower 167 on the shaft 166 is a driven member 171 which is pinned to the shaft 166 so that it pivots as one therewith and which has three legs, a first one 172 that operates normally open contacts 173 and 164 carried by the plate 165, a second one 174 that carries a contact 175 of normally closed contacts 170, and a third one 176 that is connected to a return spring 177 which is connected in turn to the plate 165. In the home position shown in FIG. II, a spring 178 urges contacts 169 and 175 together and also urges the cam follower 167 clockwise about the axis of the shaft 166 to urge the cam following roller 168 toward the cam 156 and the return spring 177 pulls the driven member 171 clockwise about the axis of the shaft 166 so that the leg 172 of the member 171 holds the contacts 173 closed. In such home position of the driven member 171, a notch 179 in the leg 176 of the member 171 is located above the free end of a latch finger 180. The latch finger 180 is pivotably mounted by means of a flexure spring 181 mounted on a bracket 182 carried by a check solenoid 183 carried in turn by a right angle bracket 184 fixed to the frame 101, the flexure spring 181 urging the latch finger 180 toward the notch 179. The check solenoid 183 is energized, when a check relay (not shown) drops out, releasing a sensing bar 185 (FIG. I) which mechanically checks as hereinafter described to see if all of the latches 147 are properly positioned before contacts 173 are closed by the leg 172. Closing of contacts 173 initiates a print-cycle. The check relay is part of a check circuit disclosed in copending U.S. application Serial No. 818,858 hereinbefore referred to which checks that the counter is receiving information and checks to see if the readout device is properly recording output information.

The sensing bar 185 is part of an assembly 186 (FIG. V) that has two legs 187 which are spaced apart a distance that is about the same as the width of the frame 101 and which are pinned to the shaft 166 to pivot as one therewith, the sensing bar 185 extending nearly the distance between the end frame members 102 adjacent faces 188 (FIG. I) to be sensed on the latches 147. The assembly 186 also includes a knock-out bar 189 which is parallel to and the same length as the sensing bar 185 and an arm 190 which rises above the left one of the legs 187 as viewed in FIG. V, the knock-out bar 189 extending nearly the distance between the end frame members 102 adjacent faces 191 (FIG. I) on the latches 147.

When a new reading is to be made, the solenoid 162 is energized whereupon the cam 156 is turned one revolution as hereinbefore described. A rise A on the cam 156, which is turned in the direction indicated by the arrow in FIG. II, drives the cam following roller 168 and the cam follower 167 counterclockwise about the axis of the shaft 166, the cam follower being loosely pivoted on the shaft 166 so as not to drive the shaft. As soon as the cam follower 167 begins to move it moves contact 169 away from contact 175 in opposition to spring 178. Opening of such contacts deenergizes the latch solenoids 131 to remove the latch ends 119 from contact with the intercepted teeth 118 as hereinbefore described. An instant later, the cam follower 167 contacts a short pin 192 carried by the leg 176 of the driven member 171 and drives the driven member counterclockwise, as viewed in FIG. II, in opposition to the return spring 177 about the axis of the shaft 166, the shaft 166 being driven in turn by the driven member 171 because the driven member is fixed thereto. Counterclockwise movement of the driven member 171 continues until point B on the leg 176 of the driven member reaches a position about opposite to the free end of the latch finger 180. During such counterclockwise movement, contact 175 follows after contact 169 but fails to catch up with it. As soon as the driven member 171 begins to move, its arm 172 allows contacts 173 to open and before the cam following roller 168 drops off of the cam 156 at point C on the cam contacts 164 are closed by the arm 172 to deenergize solenoid 162 as hereinbefore described. Opening of contacts 173 breaks the circuit to the printer. When the cam following roller 168 drops off of the cam 156 at point C on the cam, return spring 177 pivots the driven member 171 clockwise about the axis of the shaft 166 until the free end of the latch finger 180 catches in the notch 179 in the leg 176 of the driven member 171. This prevents the leg 172 of the driven member 171 from closing contacts 173 maintaining the printer disabled, but does not prevent return spring 178 from closing contacts 170 to reapply power to the latch solenoids 131, it being understood that the latch solenoids 131 are energized only when two conditions are present, i.e., contacts 170 must be closed and the signal from the binary to decimal converter circuit (FIGS. VI and VII) must call for a readout. The mechanism shown in FIG. II then is back to its home position as shown in FIG. II, except that latch finger 180 is caught in notch 179 to hold contacts 173 in the print circuit open. Hence, driven member 171 and the shaft 166 to which it is secured have three positions, namely, No. 1 position shown in FIG. II wherein the notch 179 is above and therefore free of the latch 180, No. 2 position wherein the latch 180 is caught in the notch 179, and No. 3 position wherein point B on the leg 176 of the driven member 171 is about opposite the free end of the latch 180.

In the No. 1 position of the driven member 171 and the shaft 166, the knock-out bar 189 and the sensing bar 185 are positioned as shown in FIG. I, the bars 189 and 185 moving as one with the shaft 166. When a new reading is to be made and the cam 156 is turned one revolution, the knock-out bar 189 is moved from the No. 1 position shown in FIG. I to the right, i.e., clockwise about the axis of the shaft 166 as viewed in FIG. I, contacting the four faces 191 of the four latches 147 and thus driving the latches clockwise about the axis of the stationary shaft 148 in opposition to the return springs 152. This moves the latch surfaces 154 out from underneath the faces 155 on the four rockable support members 113. Immediately, the latch solenoids 131 being deenergized with the latch ends 119 out of the path of the idler teeth 118, the four springs 137 pivot the rockable support members 113 about the axis of the stationary shaft 111 until the drive surfaces 117 of the idlers 105 contact the power wheels 103, whereby all of the drum members 108 are simultaneously started and continue in motion until they are again stopped and locked in indicating positions. The sensing bar 185 moves to the right as one with the knock-bar 189, the sensing bar 185 doing nothing at this time.

The sensing bar 185 and the knock-out bar 189 continue moving to the right as viewed in FIG. I until the driven member 171 and the shaft 166 are in the No. 3 position and then move to the left until the driven member 171 and the shaft 166 are in the No. 2 position. In the No. 2 position, i.e., the position wherein the latch 180 (FIG. II) is caught in the notch 179 of the leg 176 of the driven member 171, the sensing bar 185 is held under the influence of such latch 180 from possible contact with any parts of the latches 147 (FIG. I) and the knock-bar 189 is back to about its position shown in FIG. I wherein it cannot contact any parts of the latches 147, permitting the latches 147 to be pivoted by their return springs 152 counterclockwise about the axis of the stationary shaft 148 until stop surfaces 146 on the latches 147 contact stop surfaces 145 on the rockable support members 113.

When the drums 108 are stopped in indicating positions by the interception of the teeth 118 by the ends 119 of the latches 120 and the stop surfaces 145 on the rockable support members 113 are moved out of engagement with the stop surfaces 146 on the latches 147, the return springs 152 pivot the latches 147 counterclockwise about the axis of the stationary shaft 148 into the position shown in FIG. I and as hereinbefore described. In such position, latch surfaces 154 on the latches 147 contact faces 155 on the rockable support members 113 as shown in FIG. I locking the rockable support members 113 in place while the indicia bearing drums 108 are locked in indicia displaying position as hereinbefore described. It is possible, however, for some reason or other, that the latches 147 will not latch up properly. If the latches 147 are not positioned properly, it is not desirable to make a print. If the latches 147 are not latched up properly, the stop surfaces 145 on the rockable support members 113 by engagement with the stop surfaces 146 on the latches 147 prevent the latches 147 from moving into their position shown in FIG. I and position the faces 188 on the latches 147 in the path of the sensing bar 185.

When the check solenoid 183 (FIG. II) is energized, the latch 180 is attracted to the check solenoid 183 in opposition to the flexure spring 181 removing the free end of the latch 180 from the notch 179 in the leg 176 of the driven member 171. If the latches 147 are properly latched up as shown in FIG. I, removal of the latch 180 from the notch 179 permits the return spring 177 to move the driven member 171 from its No. 2 position to its No. 1 position which is the home position shown in FIG. II whereupon the leg 172 of the driven member 171 closes contacts 173 initiating the print cycle. If one or more of the latches 147, however, are not properly latched up, one or more of the latch faces 188 will be in the path of the sensing bar 185 as it attempts to move from the No. 2 position to the No. 1 position. This prevents the leg 172 of the driven member 171 which moves as one with the sensing bar 185 from closing contacts 173 and no print can be made. Hence, when the check solenoid 183 is energized it releases sensing bar 185 which homes if all of the latches 147 are properly positioned operating contacts 173 initiating the print cycle. The sensing bar 185 mechanically senses the latches 147 and initiates the succeeding cycle only if all of the indicia bearing members 108 are properly latched. This prevents a print from being made when the printing type bearing wheels are not properly positioned because of a malfunction in the readout device, the readout device setting up such type bearing wheels by means of the gears 109 which turn as one with the drums 108.

Ordinarily, when the latch solenoids 131 are deenergized, the flexure springs 135 straighten out to remove the latch ends 119 from engagement with the intercepted teeth 118 as hereinbefore described. However, it may happen that one of the latch ends 119 will hang up on an intercepted tooth 118 and its flexure springs 135 cannot move it clear of the tooth. To prevent this from happening, a pivotably mounted finger 193 is provided for each of the latch ends 119 which fingers 193 are rocked about the axes of cone pointed screws 194 (FIG. IV) in the end frame members 102 every time that a new reading is to be made and, if any of the latch ends 119 are stuck, drivingly contact tips 195 of such stuck latch ends and thus free such stuck latch ends. The fingers 193 are carried on a bar 196 which is pivoted on the tips of the cone pointed screws 194 and which carries a pin 197 that extends through an oblong hole 198 having a back surface 199 and a front surface 300. When the drums 108 are locked in indicating position as shown in FIG. I, a return spring 301, connected at its one end to a plate 302 which is attached to plate 140 and which defines the hole 198, fixed to the top of the pin 197 pulls the pin 197 against the back surface 199 of the oblong hole 198 keeping the bar 196 which carries the pin 197 and the fingers 193 also carried by the bar 196 in their positions shown in FIG. I wherein the fingers 193 are out of contact with the tips 195 of the latch ends 119.

When a new reading is made, the fingers 193 are rocked counterclockwise as viewed in FIG. I about the axes of the cone pointed screws 194 contacting and driving those, if any, of the latches 120 which happen to be stuck out of engagement with the intercepted ones of the idler teeth 118. The fingers 193 are rocked in such counterclockwise direction by means which includes a rod 303 that extends through a hole in an ear 304 atop the arm 190 of the sensing bar and knock out bar assembly 186 and through a hole in a finger 305 carried by the bar 196. The finger 305 resembles the fingers 193 carried by the bar 196, except, as shown in FIG. I, the finger 305 is offset relative to the other fingers 193. A collar 306 is carried near the right hand end of the rod 303, as viewed in FIG. I, a collar 307 is carried by the rod 303 intermediate its ends, and a collar 308 is carried by the rod 303 at its left hand end, the collars 306, 307 and 308 being fixed to the rod 303. A coil spring 309 surrounds the rod 303 and is compressed between the collar 306 and the ear 304 atop the arm 190, the ear 304 bearing against the collar 307 when the mechanism is latched up in readout position as shown in FIG. I. The right hand end of the collar 308 as viewed in FIG. I is rounded to rock during operation on the finger 305.

In operation, when a new reading is made, the arm 190 of the sensing bar and knock out bar assembly 186 is pivoted clockwise about the axis of the shaft 166 as hereinbefore described. The ear 304 of the arm 190 pushes against the coil spring 309 carrying the rod 303 to the right as viewed in FIG. I and pivoting the bar 196, operatively connected to the rod 303, counterclockwise about the axes of the cone pointed screws 194 whereupon the fingers 193 carried by the bar 196 are rocked counterclockwise about the axes of the cone pointed screws 194 contacting and driving those, if any, of the latches 120 which happen to be stuck out of engagement with the intercepted ones of the idler teeth 118. The rod 303 is driven to the right until the pin 197 carried by the bar 196 is stopped by engagement with the front surface 300 of the hole 198 in the plate 302. This extends the return spring 301. Further movement of the ear 304 of the arm 190 to the right compresses the coil spring 309 between the ear 304 and the collar 306 on the rod 303. Return movement of the ear 304 on the arm 190 is aided by the coil spring 309, the ear 304 moving relative to the rod 303 until it engages the collar 307 fixed on the rod 303 whereupon the ear 304 and the rod 303 move as one to their home positions. Movement of the rod 303 to the left permits the return spring 301 to pivot the bar 196 clockwise about the axes of the cone pointed screws 194 until the pin 197 carried by the bar 196 engages the back surface 199 of the hole 198 in the plate 302. This moves the fingers 193 carried by the bar 196 to positions wherein they cannot engage the latches 120 as shown in FIG. I.

A second numerical display device may be located adjacent the foregoing described device to the right of the device as viewed in FIG. IV. In this arrangement, the drive shaft 104 is extended and is used in the second device in the same way that it is used in the first device.

With reference to FIG. VIII, as hereinbefore described, that latch solenoids 131 are energized only when two conditions are present, i.e., contacts 170 must be closed and the signal from the binary to decimal converter circuit must call for a readout. As the commutator 249 approaches a position corresponding to the count in the counter 246 the voltage on the output lead 247 (indicated as "INPUT FROM CONVERTER" in FIG. VIII) rises stepwise from one voltage level to the next as it approaches the final position, the voltage level as hereinbefore described reaching four units to stop the drum member 108.

Each of the latch solenoids is provided with a three electrode electronic device 10 having two load electrodes 11 and 12, anode and cathode, and a grid or control electrode 13. The coil of the latch solenoid, the anode electrode 11 and the cathode electrode 12 are connected in series circuit relationship between the terminals 14 of a rectified voltage source. The "INPUT FROM CONVERTER" is applied to the grid 13. Only two of the latch solenoids 131 and their electronic devices 10 are shown connected to the rectified voltage source in FIG. VIII for the sake of simplicity, others of the latch solenoids and their electronic devices being connected to the rectified voltage source in the same manner. The latch activating circuits are shown and described in detail in the foregoing U.S. application Serial No. 818,858.

Each of the latch solenoids 131 responds to the readout signal from the binary to decimal converter circuit only when it is conditioned by the turning on of its power supply. This is accomplished by an R.C. time delay circuit 15 connected to D.C. voltage supply terminals 16 and including a capacitor 17 which is charged through a resistor 18 when the contacts 170 are open and discharged to a lower level, i.e., it is never completely discharged, through a variable resistor 19 having a slider 20 and through resistors 21 and 22 when the contacts 170 are closed. Resistors 21 and 22 are connected between ground and a lead 23 which connects the resistor 18 to one of the terminals 16.

As hereinbefore described, when a new reading is to be made, the cam 156 is turned through one revolution. As soon as the cam 156 begins to move, the contacts 170 are opened. Opening of the contacts 170 causes the capacitor 17 to be charged. The charged capacitor 17, which is connected to the cathodes 12 by means of a lead 24, cuts off the electronic devices 10 by raising the cathode potentials to much higher values than can ever be present on the grids 13, the potentials on the grids depending on the positions of the respective drum members 108. Cutting off of the electronic devices 10 deenergizes the latch solenoids 131 to remove the latch ends 119 from contact with the intercepted teeth 118 so that the readout mechanism can be reset. One of the features of the invention is the provision of means for turning the power back on to the latch solenoids 131 when the teeth 118 on the idlers 105 have such an orientation relative to the stopping latches 120 that the latches have time to catch the correct teeth squarely. Hence, even though the "input from converter" calls for a readout the respective latch solenoid 131 cannot respond until the capacitor 17 is discharged to a level low enough to lower the cathode potential to a point where the electronic device 10 conducts upon the receipt of a stopping signal to the grid 13.

When the cam following roller 168 drops off of the cam 156 at point C on the cam, return spring 178 closes contacts 170. Closing of contacts 170 causes the capacitor 17 to discharge through the resistors 19, 21 and 22. The discharge time can be varied by changing the position of the slider 20. Discharge of the capacitor 17 to a lower level reduces the cathode potentials to about the same value as the highest possible potentials on the grids 13, i.e., the cathode potentials are reduced to such a level that when the "INPUT FROM CONVERTER" rises to the four unit voltage levels hereinbefore described the electronic devices 10 conduct and the coils of the latch solenoids 131 are energized thereby stopping the drum members 108 each at one of the ten possible stopping positions. The resistors 21 and 22 are of a size to set the cathodes at a reference voltage compared to such four unit voltage level when the contacts 170 are closed. Hence, the latch solenoid circuits are conditioned for energization by the discharge of the capacitor 17.

The latch solenoids 131 respond to the readout signals from the binary to decimal converter circuits only when they are conditioned by the turning on of their power supply. By varying the delay provided by the R.C. time delay circuit 15 it is possible to condition the latch solenoids for operation only when the idlers 105 are so positioned relative to the stopping latches 120 that on transmittal of the readout signals from the binary to decimal converter circuits the stopping latches intercept the teeth on the idlers 105 squarely.

With reference to FIG. I, there is no phasing problem when the idler tooth 118 to be stopped is relatively far from the stopping end of the latch 120 at the time of transmittal of a readout signal to the respective grid 13. The problem exists only when such signal is transmitted just when the idler tooth 118 to be stopped is at the latch 120 so that operation of the latch causes it to catch on the tip of the tooth causing damage to the tooth and/or causing the drum member 108 to stop in an incorrect indicating position. The problem is solved according to the invention by so adjusting the time delay provided by the time delay circuit 15 that the power supply for the latch solenoid 131 is turned back on only when any one of the teeth 118 is about in position X (FIG. I). Every tooth 118 then is so positioned that the latch 120 has time on transmittal of a readout signal to catch the correct tooth squarely.

When one of the teeth is in the foregoing position X the brushes 252–260 (FIG. VII) are on one of the segment lines 261 which divide the commutator 249 into ten equal segments one for each number to be indicated, the commutator 249 being so mounted in the drum member 108 that one of the segment lines 261 is at the brushes whenever one of the teeth 118 is in position X. Hence, the power supply for the latch solenoid 131 is turned back on when the brushes 252–260 are in between segments so that the latch 120 has time to catch the correct tooth squarely. Let us say, for example, that the segment line 261 separating the segment for reading out the number zero from the segment for reading out the number eight is on the brushes and a zero readout is required. The zero segment being past the brushes, the commutator circuit cannot call for a zero number readout until the segment line 261 separating the zero segment from the four segment returns to the brushes. In such position, every tooth 118 is so positioned that the latch 120 has time to catch the correct tooth squarely. In the stopped position, the brushes have about fifteen percent of the distance still to go across the zero segment.

The problem solved is one of phasing. As soon as the cam 156 starts turning through its single revolution to make a new reading, the contacts 170 are opened cutting off the power supply immediately to the stopping latches 120 and the toothed-idlers 105 are simultaneously started up through the friction drive. Power is reapplied to the stopping latches 120 when the commutator brushes are in a certain phase relationship with the commutator to condition the latch solenoids 131 for possible operation only when every tooth is so oriented relative to its stopping latch that such latch has time on transmittal of a readout signal to move in to catch the correct tooth squarely. The slider 20 is positioned by trial and error to vary the delay provided by the time delay circuit until the teeth 118 are stopped properly by the stopping latches 120. When stopped, the teeth on every idler are aligned or in phase with the teeth on every other idler. Since the idlers are started simultaneously, during rotation the teeth on every idler are aligned or in phase with the teeth on every other idler. Turning the power back on to the latch solenoids 131 when a tooth on each of the idlers is in position X keeps the stopping latches 120 in phase with the idlers, i.e., the latches always start in to catch the idlers when the selected teeth each is still spaced nearly a distance equal to the distance between any two teeth away from its stopping latch.

Another feature of the numerical display device is the provision of mechanism having a consistent operating time from readout cycle to cycle for operating the contacts 170 in the time delay circuit 15. This mechanism comprises the single-revolution clutch controlled cam 156 and its follower which open the contacts 170 to first remove power from the latch solenoids 131 when a new reading is to be made to permit removal of the latches from their teeth-obstructing positions and then reapply power to such solenoids to so condition them that they will respond to signals from the binary to decimal converter circuits. In many prior numerical display devices, power is removed and reapplied by means having indeterminate operating times. Therefore, the ideal interceptions of teeth on the toothed-members in such prior devices happened only as a matter of chance. Power is removed and reapplied to the latch solenoids 131 by the single-revolution clutch controlled cam 156 and its follower having a determinate operating time, the adjustable time delay being provided by the time delay circuit 15 to make such time between power removal and reapplication such that optimum performance is obtained from the numerical display device. Hence, the time between such power removal and reapplication remains the same from readout cycle to cycle.

In conclusion it is pointed out that while the illustrated example constitutes a practical embodiment of our invention, we do not limit ourselves to the exact details shown, since modification of the same may be undertaken without departing from the spirit of this invention.

Having described the invention, we claim:

1. A readout device comprising, in combination, a rotatable member to be positioned according to information in an electrical circuit, a toothed-member for driving the rotatable member, stopping means engageable with a tooth on the toothed-member for stopping the rotatable member in the position corresponding to the information, means for conditioning the stopping means for operation when a tooth has just passed the stopping means, and means for operating the conditioned stopping means as the rotatable member approaches the position corresponding to the information.

2. A readout device comprising, in combination, a rotatable member to be positioned according to information in an electrical circuit, a toothed-member for driving the rotatable member, stopping means engageable with a tooth on the toothed-member, and means, operable when every tooth is so positioned relative to the stopping means that the stopping means has time to catch the correct tooth squarely, for operating the stopping means as the rotatable member approaches the position corresponding to the information.

3. A readout device comprising, in combination, a rotatable member to be positioned according to information in an electrical circuit, a plurality of rotatable teeth operatively connected to the rotatable member, means for rotating the member and the teeth, stopping means engageable with any one of the teeth for stopping the rotatable member in the position corresponding to the information, supervisory means controlling the stopping means, the supervisory means allowing operation of the stopping means only when a rotating tooth has just passed the stopping means, and commutator circuit means for operating, when permitted by the supervisory means, the stopping means as the rotatable member approaches the position corresponding to the information.

4. A readout device comprising, in combination, a rotatable member to be positioned according to information in an electrical circuit, a plurality of rotatable teeth operatively connected to the rotatable member, means for rotating the member and the teeth, stopping means engageable with a tooth, and commutator circuit means, operable only when every tooth is so positioned relative to the stopping means that the stopping means has time to catch the correct tooth squarely, for operating the stopping means as the rotatable member approaches the position corresponding to the information.

5. A readout device comprising, in combination, a rotatable member to be positioned according to a count accumulated in an electronic counter, a toothed-member for driving the rotatable member, electrically-operated stopping means engageable with a tooth on the toothed-member for stopping the rotatable member in the position corresponding to the count, time delay circuit means in circuit with the electrically-operated stopping means for conditioning the stopping means for operation when a tooth has just passed the stopping means, and means for operating the conditioned stopping means as the rotatable member approaches the position corresponding to the count.

6. A readout device comprising, in combination, a rotatable member to be positioned according to a count accumulated in an electronic counter, a toothed-member for driving the rotatable member, electrically-operated stopping means engageable with a tooth on the toothed-member, and commutator circuit means in circuit with the electrically-operated stopping means, operable only when every tooth is so positioned relative to the stopping means that the stopping means has time to catch the correct tooth squarely, for operating the stopping means as the rotatable member approaches the position corresponding to the count.

7. A readout device comprising, in combination, a rotatable member, means for driving the rotatable member, electrically-operated stopping means for stopping the rotatable member in a position corresponding to information in an electrical circuit, and adjustable time delay circuit means in circuit with the electrically-operated stopping means for conditioning the stopping means for operation when the rotatable member has a selected orientation relative to the stopping means.

8. A readout device comprising, in combination, a rotatable member, means for driving the rotatable member, electrically-operated stopping means for stopping the rotatable member in a position corrsponding to information in an electrical circuit, time delay circuit means in circuit with the electrically-operated stopping means, the time delay circuit means including a set of contacts, and means having a consistent operating time from cycle to cycle for operating the contacts to remove power from the electrically-operated stopping means thereby permitting resetting of the readout device when a new reading is to be made and for operating the contacts to reapply power to the electrically-operated stopping means for conditioning the electrically-operated stopping means for operation, the time delay circuit means providing an adjustable delay between the removal and the reapplication of the power to condition the electrically-operated stopping means for operation when the rotatable member has a selected orientation relative to the stopping means.

9. A readout device comprising, in combination, a rotatable member, means for driving the rotatable member, electrically-operated stopping means for stopping the rotatable member in a position corresponding to information in an electrical circuit, and adjustable means in circuit with the electrically-operated stopping means for removing power from the stopping means thereby permitting resetting of the readout device when a new reading is to be made and for reapplying power to the stopping means to condition the stopping means for operation, the adjustable means providing an adjustment of the time between the removal and reapplication of the power to condition the electrically-operated stopping means for operation when the rotatable member has a selected orientation relative to the stopping means.

10. A readout device comprising, in combination, a rotatable member, means for driving the rotatable member, electrically-operated stopping means for stopping the rotatable member in a position corresponding to a count accumulated in an electronic counter, and adjustable means in circuit with the electrically-operated stopping means for removing and reapplying power to the stopping means, the adjustable means providing an adjustment of the time between the removal and reapplication of the power for reapplying power only when the rotatable member has a selected orientation relative to the stopping means, whereby the stopping means is operable only when the rotatable member is in such selected orientation.

11. A readout device comprising, in combination, a rotatable member, means for driving the rotatable member, stopping means for stopping the rotatable member in a position corresponding to information in an electrical circuit, and means, operable only when the rotatable member has a certain orientation relative to the stopping means, for operating the stopping means as the rotatable member approaches the position corresponding to the information.

12. A readout device comprising, in combination, a rotatable member to be positioned according to information in an electrical circuit, a toothed-member for driving the rotatable member, stopping means engageable with any one of the teeth on the toothed-member for stopping the rotatable member in the position corresponding to the information, operating means, a part of which is rotated in synchronism with the rotatable member, for operating the stopping means as the rotatable member approaches the position corresponding to the information, the operating means including a commutator having connected segments one for each possible stopping position of the rotatable member and a plurality of cooperating brushes including an output brush operatively connected to the stopping means and a plurality of input brushes each connected to the electrical circuit, and means for conditioning the stopping means for operation when the input brushes are between segments.

13. A readout device comprising, in combination, a rotatable member to be positioned according to information in an electrical circuit, a toothed-member for driving the rotatable member, stopping means engageable with any one of the teeth on the toothed-member for stopping the rotatable member in the position corresponding to the information, and operating means for operating the stopping means as the rotatable member approaches the position corresponding to the information, the operating means including a commutator rotated in synchronism with the rotatable member and having connected segments one for each possible readout position of the rotatable member and a plurality of cooperating brushes including an output brush operatively connected to the stopping means and a plurality of input brushes each connected to the electrical circuit, the operating means being operable when the input brushes are between segments.

14. A readout device comprising, in combination, a rotatable member to be positioned according to information in an electrical circuit, a plurality of rotatable teeth operatively connected to the rotatable member, means for rotating the member and the teeth, stopping means engageable with any one of the teeth for stopping the rotatable member in the position corresponding to the information, operating means, a part of which is rotated in synchronism with the rotatable member, for operating the stopping means as the rotatable member approaches the position corresponding to the information, the operating means including a commutator having connected segments one for each possible stopping position of the rotatable member and a plurality of cooperating brushes including an output brush operatively connected to the stopping means and a plurality of input brushes each connected to the electrical circuit, and adjustable time delay circuit means controlling the stopping means, the time delay circuit means allowing operation of the stopping means only when the input brushes are between segments.

15. A readout device comprising, in combination, a rotatable member to be positioned according to information in an electrical circuit, a plurality of rotatable teeth operatively connected to the rotatable member, means for rotating the member and the teeth, stopping means engageable with any one of the teeth, and operating means for operating the stopping means as the rotatable member approaches the position corresponding to the information, the operating means including a commutator rotated in synchronism with the rotatable member and having connected segments one for each possible readout position of the rotatable member and a plurality of cooperating brushes including an output brush operatively connected to the stopping means and a plurality of input brushes each connected to the electrical circuit, the operating means being operable when the input brushes are between segments.

16. A readout device comprising, in combination, a rotatable member to be positioned according to a count accumulated in an electronic counter, a toothed-member for driving the rotatable member, electrically-operated stopping means engageable with any one of the teeth on the toothed-member for stopping the rotatable member in the position corresponding to the count, operating means, a part of which is rotated in synchronism with the rotatable member, for operating the stopping means as the rotatable member approaches the position corresponding to the count, the operating means including a commutator and a plurality of cooperating brushes including an output brush operatively connected to the stopping means and a plurality of input brushes each connected to the counter, and time delay circuit means in circuit with the electrically-operated stopping means for conditioning the stopping means for operation when the input brushes are between segments.

17. A readout device comprising, in combination, a rotatable member, means for driving the rotatable member, stopping means, a part of which is rotated in synchronism with the rotatable member, for stopping the rotatable member in a position corresponding to information in an electrical circuit, the stopping means including a commutator having connected segments one for each possible readout position of the rotatable member and a plurality of cooperating input brushes each connected to the electrical circuit, and adjustable time delay circuit means in circuit with the stopping means for conditioning the stopping means for operation when the brushes are between segments.

18. A readout device comprising, in combination, a rotatable member, means for driving the rotatable member, stopping means for stopping the rotatable member in a position corresponding to information in an electrical circuit, the stopping means, including a commutator rotated in synchronism with the rotatable member and a plurality of cooperating input brushes each connected to the electrical circuit, and adjustable time delay circuit means in circuit with the stopping means for conditioning the stopping means for operation when the commutator has a selected orientation relative to the brushes.

19. A readout device comprising, in combination, a rotatable member, means for driving the rotatable member, electrically-operated stopping means, a part of which is rotated in synchronism with the rotatable member, for stopping the rotatable member in a position corresponding to information in an electrical circuit, the stopping means including a commutator and a plurality of cooperating input brushes each connected to the electrical circuit, and adjustable means in circuit with the stopping means for removing power from the stopping means thereby permitting resetting of the readout device when a new reading is to be made and for reapplying power to the stopping means to condition the stopping means for operation, the adjustable means providing an adjustment of the time between the removal and reapplication of the power to condition the stop means for operation when the commutator has a selected orientation relative to the brushes.

References Cited in the file of this patent
UNITED STATES PATENTS
2,759,672     Simonds et al. _____ Aug. 21, 1956